(No Model.)

B. M. RAWLINGS & C. A. WILLIAMSON.
STREET CAR.

No. 337,617. Patented Mar. 9, 1886.

Attest:
Charles Pickles
J. W. Hoke

Inventor:
Budd M. Rawlings
Catharine A. Williamson
by C. D. Moody, atty

United States Patent Office.

BUDD M. RAWLINGS AND CATHARINE A. WILLIAMSON, OF ST. LOUIS, MO.

STREET-CAR.

SPECIFICATION forming part of Letters Patent No. 337,617, dated March 9, 1886.

Application filed October 3, 1885. Serial No. 178,951. (No model.)

*To all whom it may concern:*

Be it known that we, BUDD M. RAWLINGS and CATHARINE A. WILLIAMSON, of St. Louis, Missouri, have jointly made a new and useful Improvement in Street-Cars, of which the following is a full, clear, and exact description.

The improvement is an appliance which can be attached to a street-car and brought into use when it is desired to remove a car from or return it to its track; and it consists, substantially, in a wheel attached to an arm or bracket which is so attached to the car body or frame that it can be swung or lowered to bring the wheel to or toward the ground, and is provided with an arm, projection, or attachment which, when the wheel arm or bracket is moved downward, is brought beneath the car-axle or other part of the car, and thereby made to raise the car sufficiently for its regular wheels to clear the ground, and thereby enable the car to be supported and moved upon the auxiliary wheel. One of these appliances can be used at each end of the car.

The annexed drawings exhibit a car having the improvement.

Figure 1:
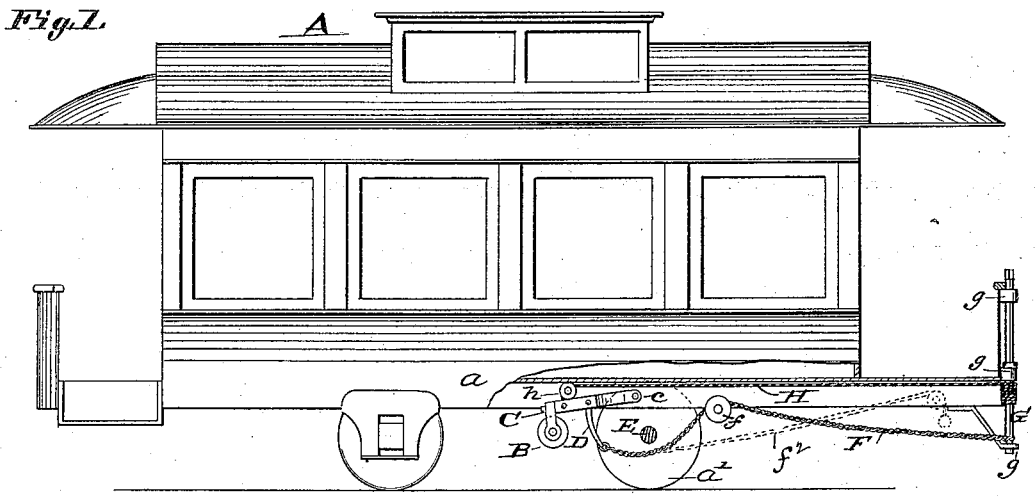
Figure 2:
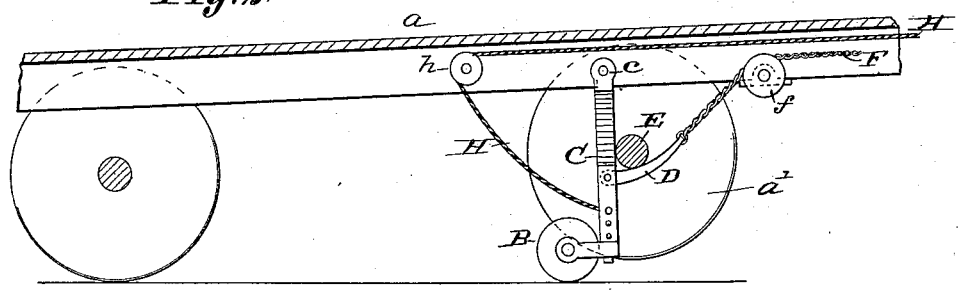
Figure 3:
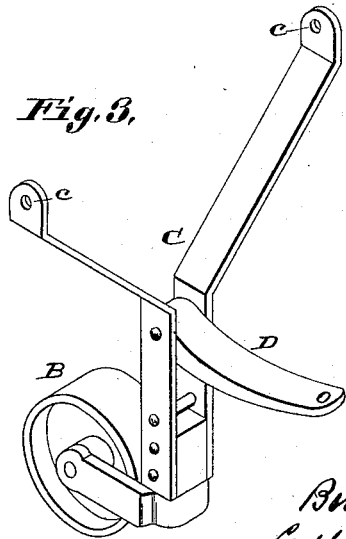

Figure 1 is a side elevation, partly in section, of the car. Fig. 2 is a vertical longitudinal section, upon an enlarged scale, of that portion of the car with which the improvement is immediately connected; and Fig. 3 is a view in perspective of the auxiliary wheel and its supporting bracket.

The same letters of reference denote the same parts.

The car A, saving as it may be modified by the application of the improvement, is of any of the customary forms.

B represents a caster-wheel journaled in the bracket C. The bracket at its upper end, at $c\ c$, is journaled to the car-body $a$, so that it, carrying the caster-wheel, can be swung upward and downward, as indicated by the two positions shown respectively in Figs. 1, 2. When the bracket is swung upward, the car is supported by its regular wheels, $a'$, and when it is swung downward the caster-wheel B becomes the car-support and the wheels $a'$ are off the ground. The bracket C is provided with an arm, D, which when the bracket is swung downward is drawn beneath the car-axle, and the effect of the operation is to lift the car-axle E, and that end of the car to which that axle belongs, substantially as is represented in Fig. 2. To enable the wheel-bracket to be thus drawn, a chain, F, leads from the arm D forward, and is carried around the upright shaft G, which is held and adapted to be rotated in suitable bearings, $g$, upon the car, and by rotating the shaft, which can be done in any suitable manner, and by any suitable means — such as a handle applied to the shaft—the chain is wound upon the shaft and the parts brought into the position of Fig. 2. The car can now be rolled upon the wheel B to the desired point, after which the bracket carrying the wheel B is withdrawn from supporting the car, and preferably by the following means:

H represents a chain leading from the bracket toward the center of the car, passing over the bearing or sheave $h$, and thence to the shaft G, upon which the chain H is adapted to be wound, but in the opposite direction to the chain F. Then, as the shaft G is unwound to release the chain F, the chain H is wound upon the shaft, and the parts are brought into the position of Fig. 1. The chain F may run over the sheave $f$, as thereby a more directly upward pull upon the chain can be obtained.

In the place of winding the chain F upon the shaft G, or operating it by hand-power, it may extend toward the end of the car—say as indicated by the dotted lines $f'$, Fig. 1—and be adapted to be drawn by horse-power. The arm D, so far as drawing the bracket forward is concerned, is in effect a part of the chain F, and in this respect the arm might be omitted and the chain connected directly with the bracket. The bracket, also, can be drawn down, and the wheel B be made to lift the car, independently of the car-axle E. It is better, however, to take advantage of the car-axle, and employ the arm D, as thereby, when the wheel B is coming to a bearing upon the ground, the car, by means of its axle acting as a roller, can roll upon the arm D, and the wheel B more readily be brought into position beneath the car.

We claim—

1. A street-car having an arm or bracket that can be swung or lowered to bring the wheel to or toward the ground and is provided with an arm, projection, or attachment which, when the wheel-arm or bracket is moved downward, is brought beneath the car-axle or other part of the car, as and for the purpose described.

2. The combination of the body $a$, the pivoted bracket C, the wheel B, the arm D, the chain F, and the shaft G, substantially as described.

3. The combination of the car-body $a$, the pivoted bracket C, the wheel B, the arm D, the chains F H, the bearing $h$, and the shaft G, substantially as described.

4. A car-body having a swinging bracket or arm carrying at the lower end a caster-wheel and between the ends provided with an arm, and a connection leading therefrom to the end of the car for the purpose of swinging the caster-wheel bracket or arm downward and drawing the bracket-arm beneath the car-axle, substantially as described.

Witness our hands.

BUDD M. RAWLINGS.
CATHARINE A. WILLIAMSON.

Witnesses:
C. D. MOODY,
J. W. HOKE.